US006912182B2

(12) United States Patent
Nogami

(10) Patent No.: US 6,912,182 B2
(45) Date of Patent: Jun. 28, 2005

(54) ACTUATOR FOR AN OPTICAL PICKUP APPARATUS AND METHOD OF PRODUCING AN ACTUATOR FOR AN OPTICAL PICKUP APPARATUS

(75) Inventor: Toyoshi Nogami, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 506 days.

(21) Appl. No.: 10/212,867

(22) Filed: Aug. 7, 2002

(65) Prior Publication Data

US 2003/0039199 A1 Feb. 27, 2003

(30) Foreign Application Priority Data

Aug. 22, 2001 (JP) ..................................... P2001-251369

(51) Int. Cl.[7] ................................................ G11B 7/00
(52) U.S. Cl. ..................... 369/44.14; 359/813; 359/823
(58) Field of Search ......................... 369/44.11, 44.14, 369/44.15, 44.27, 112.01; 359/813, 814, 823, 824

(56) References Cited

U.S. PATENT DOCUMENTS 5,956,188 A * 9/1999 Lee .......................... 369/44.14
6,091,553 A * 7/2000 Song et al. ............... 369/44.14
6,580,569 B2 * 6/2003 Choi et al. ................ 369/44.14

FOREIGN PATENT DOCUMENTS

JP          5-4313 U      1/1993
JP          7-70081 B     7/1995

* cited by examiner

Primary Examiner—Muhammad Edun
(74) Attorney, Agent, or Firm—Morgan, Lewis & Bockius LLP

(57) ABSTRACT

An actuator for an optical pickup apparatus includes an actuator base member having a pair of yoke portions rising up from a base portion as well as a pair of magnets respectively secured to inner side surfaces of the yoke portions, a yoke member having a pair of yokes rising up from a baseplate portion. The yokes are respectively inserted in a pair of insertion holes of the base portion, and the baseplate portion is superposed on the base portion. The yokes are bonded to the base portion by an adhesive, and the baseplate portion is secured to the base portion by a fixing member.

9 Claims, 3 Drawing Sheets

ACTUATOR FOR AN OPTICAL PICKUP APPARATUS AND METHOD OF PRODUCING AN ACTUATOR FOR AN OPTICAL PICKUP APPARATUS

BACKGROUND OF THE INVENTION

1. Field of the Invention

The present invention relates to an actuator for an optical pickup apparatus used in the reproduction and/or recording of a compact disk (CD), a digital video disk (DVD), and the like.

2. Description of the Related Art

Conventionally, an optical pickup apparatus having an actuator of an axially slidable type is known in which a lens holder holding an objective lens is provided in such a manner as to be slidable with respect to a supporting shaft in its axial direction and to be rotatable about the axis. An electrically driving circuit is formed by a pair of tracking coils and a focusing coil which are fitted to the lens holder as well as a pair of yokes and a pair of magnets formed of a magnetic material and respectively disposed on both sides of the lens holder. The arrangement provided is such that as drive currents are allowed to flow across the tracking coils and the focusing coil, by means of the lens holder the objective lens is rotated in a tracking direction about the axis of the supporting shaft and is moved in a focusing direction along the axis of the supporting shaft.

However, with the conventional actuator of the axially slidable-type optical pickup apparatus, since the arrangement provided is such that a yoke member in which a pair of yokes are provided on a baseplate portion is fixed by a plurality of screws to an actuator base member which is attached to a main base member, the fixing strength of the yokes provided for the purpose of obtaining a sufficient driving force by strengthening the magnetic forces of the magnets is insufficient. Therefore, trouble occurred in that the yokes resonate in a high-frequency range at a resonance frequency of 5 to 8 kHz in correspondence of the oscillation of the lens holder. In the case where the yokes resonate in a high-frequency range at the aforementioned resonance frequency, there arises a problem in that servo control characteristics of the actuator of the optical pickup apparatus at the time of effecting focusing and tracking deteriorate, and the response characteristics of the lens holder become poor, thereby making it impossible to effect high-accuracy servo control.

Apart from the above-described case, the following two techniques are known as countermeasures against the unwanted resonance in the optical pickup apparatus. One is an optical-head mounting mechanism (refer to Japanese utility model publication No. 5-4313) in which in a case where oscillation has occurred in the optical head as drive systems for tracking and focusing are driven at a tip of the optical head, the resonance of an optical head-mounting base due to its effect is suppressed. The other is an objective-lens driving apparatus (referred to JP-B-7-70081) in which the jumping out of a drive coil to the magnet side is prevented, and improvements are made in the high-frequency resonance characteristics of the drive coil.

With the above-described optical-head mounting mechanism, however, a tracking control magnet yoke, which is provided so as to allow a tracking control air-core coil of the optical head is swingably inserted therethrough, is provided with an L-shaped weight by means of a resilient member, whereby the mass of the optical head-mounting base is increased to make it difficult for the resonance due to the effect of the resonance of the optical head to occur, or the resonance point is changed to a location which does not affect focusing or tracking, and the oscillation is absorbed by the resilient member, so as to alleviate the adverse effect on the optical pickup. Accordingly, since such an arrangement basically differs in construction from that of the actuator in the above-described axially slidable-type optical pickup apparatus, this arrangement cannot be used as a means for eliminating the unwanted resonance caused by the yoke of the actuator in the above-described pickup apparatus.

On the other hand, with the above-described objective-lens driving apparatus, a free side of the drive coil is pressed down by the tension of a wire to prevent the jumping out of the drive coil toward the magnet side, and the free side of the drive coil is fixed by an adhesive-reinforcing layer to enhance the rigidity of the drive coil, thereby raising the resonance point of the drive coil to a higher range to improve the high-frequency resonance characteristics. Accordingly, even if a change is made in some portion of it, such a construction cannot still be used as a means for eliminating the unwanted resonance caused by the yoke of the actuator in the above-described axially slidable-type pickup apparatus.

SUMMARY OF THE INVENTION

Accordingly, the invention has been devised in view of the above-described conventional problems, and its object is to provide an actuator for an optical pickup apparatus having an arrangement which makes it possible to shift the resonance frequency of the yokes to a high-frequency range which does not affect the focusing function and the tracking function by increasing the fixing strength of the yokes with respect to the actuator base member.

To attain the above object, in accordance with the invention there is provided an actuator for an optical pickup apparatus, including: an actuator base member including a base portion having a pair of insertion holes, a pair of yoke portions rising up from the base portion, and a pair of magnets each secured to an inner side surface of the yoke portion; a yoke member including a baseplate portion and a pair of yoke rising up from the baseplate portion; a supporting shaft disposed uprightly on the base portion at a position located between the pair of magnets; a lens holder on which an objective lens and coils are attached, the lens holder being provided in such a manner as to be slidable with respect to the supporting shaft in an axial direction of the supporting shaft and to be rotatable about an axis of the supporting shaft; a fixing member for securing the actuator base member and the yoke member; and an adhesive for bonding the actuator base member and the yoke member, wherein each yoke of the yoke member is inserted through each insertion hole and the baseplate portion is superposed on the base portion, the baseplate portion and the base portion is secured by the fixing member, and the yoke's portion fitted in the insertion hole is bonded to the base portion by the adhesive.

With the actuator for the optical pickup apparatus, in a case where a tracking error or a focusing error has occurred to the objective lens, a drive current is supplied to a corresponding tracking coil to rotate the lens holder with respect to the supporting shaft about its axis or vertically move the lens holder along the axial direction. Consequently, the objective lens is displaced in a tracking direction or in a focusing direction, thereby correcting the tracking error or the focusing error. In this case, since oscillation occurs in the lens holder when it is driven, the yokes resonate in a high-frequency range in correspondence with the oscillation of the lens holder.

In addition to the fact that the baseplate portion of the yoke member is fixed by the fastening force of the fixing member, at least the yokes are bonded to the base portion by the adhesive to reinforce the fixing strength, so that the yokes are secured to the actuator base member with extremely high fixing strength. For this reason, the yokes resonate in a high-frequency range at a resonance frequency of not less than 10 kHz which exerts no adverse effect on the focusing and tracking of the actuator. For this reason, in the case of this actuator for the optical pickup apparatus, servo control characteristics at the time when the actuator effects focusing and tracking can be constantly maintained with high accuracy.

DETAILED DESCRIPTION OF THE PREFFERED EMBODIMENTS

Referring now to the appended drawings, a detailed description of a preferred embodiment of the invention will be given.

Figure 1:
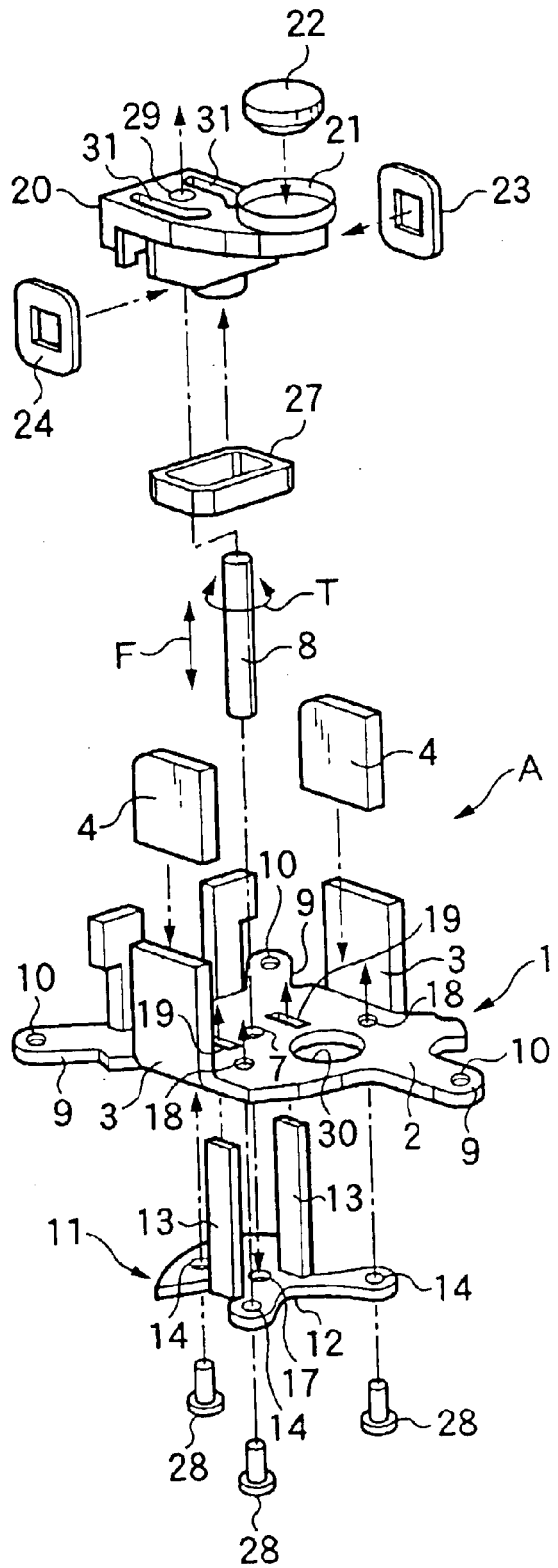
FIG. 1 is an exploded perspective view illustrating the construction of essential portions of an actuator for an optical pickup apparatus in accordance with an embodiment of the invention.
Figure 2:
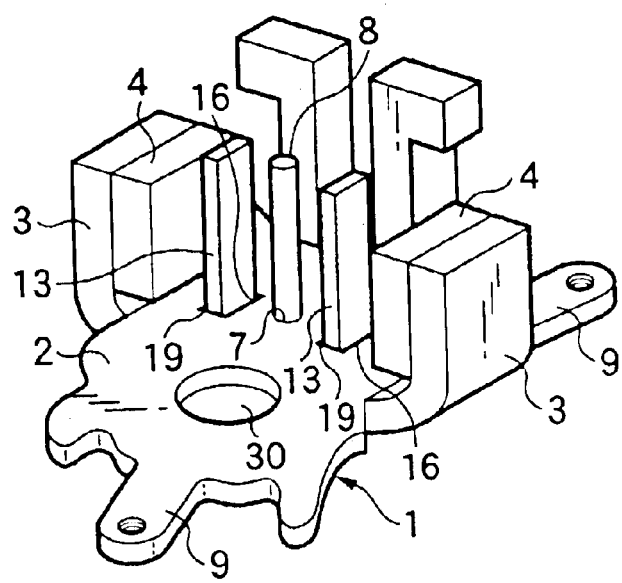
FIG. 2 is a perspective view illustrating the construction of essential portions in an assembled state of the actuator.
Figure 3A:
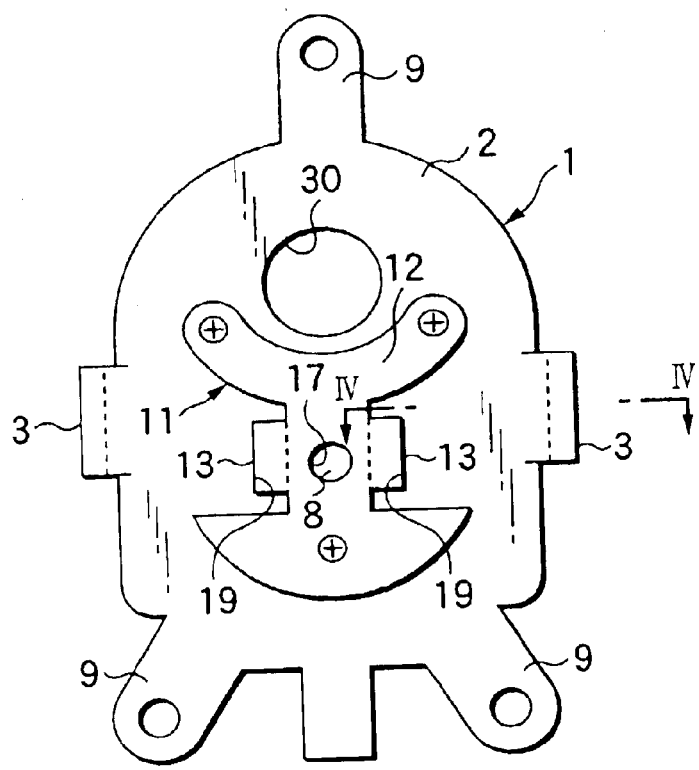
FIG. 3A is a bottom view of FIG. 2.

FIG. 1 is an exploded perspective view illustrating the construction of essential portions of an actuator A for an optical pickup apparatus in accordance with an embodiment of the invention. FIG. 2 is a perspective view illustrating the construction of essential portions in accordance with the invention in an assembled state of the actuator. FIG. 3A is a bottom view of FIG. 2. In these drawings, the actuator A for the optical pickup apparatus includes an actuator base member 1, a yoke member 11, a supporting shaft 8, and a lens holder 20.

The actuator base member 1 is attached to a main base member (not shown) on which a light-emitting/receiving unit, a half mirror, a prism mirror, and the like of the optical pickup apparatus are mounted. A pair of yoke portions 3 respectively extend from mutually opposing side edges of a base portion 2 in orthogonal directions (upwardly in the drawings). A pair of magnets 4 are respectively bonded to opposing surfaces (inner side surfaces) of the pair of yoke portions 3 by an adhesive.

In addition, in the actuator base member 1, the supporting shaft 8 is press-fitted and fixed in a fitting hole 7, which is bored in a central portion of the base portion 2, so as to be disposed uprightly, and threaded holes 10 are respectively formed in three extending attaching pieces 9. The actuator base member 1 is fixed to the aforementioned main base member as adjusting screws (not shown) are respectively screwed in the three threaded holes 10 and corresponding threaded holes in the main base member in a state in which springs are interposed between the actuator base member 1 and the main base member. The arrangement provided is such that as the amounts of screwing-in of the three adjusting screws are made variable, the angle of inclination of the actuator base member 1 with respect to the main base member is adjusted.

The yoke member 11, which is secured to the actuator base member 1, has such a shape that a pair of rectangular yokes 13 rise up from mutually opposing side edges of a baseplate portion 12 which is substantially Y-shaped in a plan view, as shown in FIG. 3A. In the baseplate portion 12, attaching holes 14 are respectively bored in its three projecting end portions, and an insertion hole 17 for the supporting shaft 8 is formed in a central portion thereof. Correspondingly, in the baseplate portion 2 of the actuator base member 1, threaded holes 18 are formed at positions corresponding to the attaching holes 14 of the yoke member 11, and a pair of insertion holes 19 for the insertion of the pair of yokes 13 from below are bored therein.

Figure 3B:
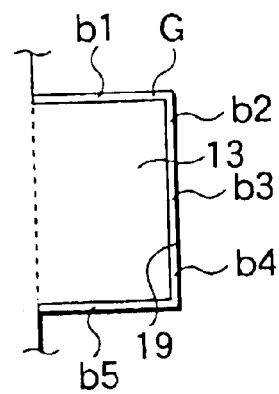
FIG. 3B is a enlarged view illustrating the essential portion of FIG. 3A.

As shown in FIG. 3B, the opening area of each insertion hole 19 is slightly larger than the sectional area of each yoke 13, so that a gap G is formed therebetween. If the opening area of the insertion hole 19 and the sectional area of the yoke 13 is the same, inserting the yoke 13 into the insertion hole 19 becomes difficult and assembling operation becomes troublesome. The dimension of the gap G is appropriately determined so as to make the assembling operation smooth and an adhesive is smoothly injected and hardened.

The yoke member 11 is secured to the actuator base member 1 in the following procedure. Namely, as shown in FIG. 1, the pair of yokes 13 are inserted from below into the insertion holes 19 of the actuator base member 1, a lower end portion of the supporting shaft 8 projecting downwardly from the base portion 2 of the actuator base member 1 is inserted in the insertion hole 17 of the yoke member 11, and the upper surface of the baseplate portion 12 of the yoke member 11 is superposed on a lower surface of the base portion 2 of the actuator base member 1.

Subsequently, the base portion 2 of the actuator base member 1 and the baseplate portion 12 of the yoke member 11 in the superposed state are secured by fixing screws 28 which are inserted into the three threaded holes 18 of the actuator base member 1. The fixing screws 28 are inserted through the attaching holes 14 of the yoke member 11, and then inserted into the threaded holes 18 of the actuator base member 1. Next, from the yoke member side, the adhesive is supplied into the gap G shown in FIG. 3B. Injecting the adhesive by injecting means such as a nozzle at several points of the gap, which surround the yoke 13, is preferable. For example, as shown in FIG. 3B, injecting the small amount of adhesive at each of five injecting points b1 to b5 so as to fill the gap G is preferable. The number of injecting point is not limited to five. It may be more than five or less than five. The nozzle may have an injecting diameter of 1 mm.

Figure 4:
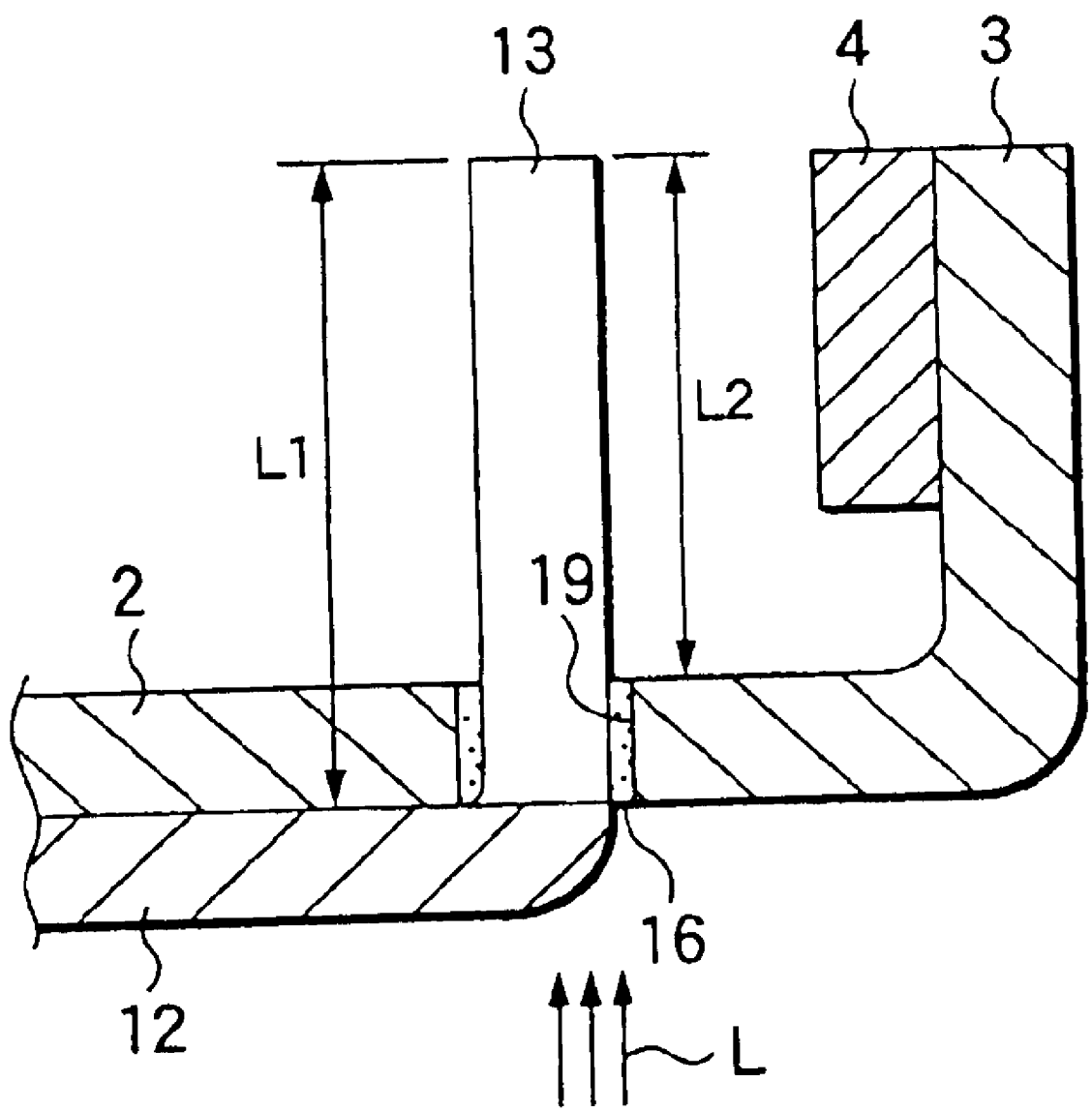
FIG. 4 is a partial cross sectional view, taken along the line IV—IV in FIG. 3A.

FIG. 4 shows a cross sectional view, taken along the line IV—IV in FIG. 3A. As shown in FIG. 4, the space between the insertion hole 19 and the yoke 13 is filled with the adhesive 16. The adhesive 16 is not ejected from the lens holder-side-surface (upper surface in FIG. 4) of the base portion 2. Conventionally, since nothing is supplied in the space between the insertion hole and the yoke, the yoke 13 can perform free oscillation over the length L1. Thus resonance occurs at relatively low frequency such as 5 to 8 kHz, causing adverse affects for focusing and tracking function. By supplying the adhesive 16 between the insertion hole 19 and the yoke 13 as shown in FIG. 4, the yoke 13 can perform free oscillation over the length L2 and resonance occurs at more than 5 to 8 kHz. In this embodiment, the length L2 is same with the yoke portion's length, over which the yoke portion 3 can perform free oscillation. In this embodiment, resonance frequency becomes a value not less than 10 kHz. For example, the length L1 may be 8.9 mm and the length L2 may be 7.7 mm.

In case of using an ultraviolet activated adhesive as the adhesive 16, ultraviolet ray L is irradiated to the adhesive 16 after filling the space with the adhesive 16, so that the adhesive 16 is hardened. The ultraviolet ray 16 is irradiated from the side from which injecting of the adhesive 16 is performed. For example, the adhesive 16 is hardened by irradiating the ultraviolet ray L for 20 to 30 seconds. But irradiating time is not limited to 20 to 30 seconds. For example, TB3033B manufactured by Three Bond Company, Ltd. (Shore hardness D: 80) may be used as the ultraviolet activated adhesive.

As a result, the yoke member 11 is secured to the actuator base member 1 with high fixing strength by virtue of the bonding by the adhesive 16 and the fastening force of the fixing screws 28. At this time, the yokes 13 are respectively disposed in face-to-face relation to the opposing magnets 4 each with a predetermined interval, and function so as to enhance the driving force for the lens holder, which will be described later, by strengthening magnetic forces of the magnets 4.

In the lens holder 20 shown in FIG. 1, an objective lens 22 is held in a lens holding portion 21 which is provided on the lens holder 20 so as protrude from the lens holder 20. A pair of tracking coils 23 and 24 are fitted to opposing side surfaces of the lens holder 20. A focusing coil 27 is fitted to an underside of the lens holder 20. As for the lens holder 20 thus assembled, the supporting shaft 8 is fitted from below into its bearing portion 29, and upper end portions of the yokes 13 are respectively fitted loosely in a pair of guide holes 31, such that the lens holder 20 is held so as to be slidable with respect to the supporting shaft 8 in its axial direction and to be rotatable about the axis. At this time, the objective lens 22 held in the lens holding portion 21 is positioned immediately above a light passage hole 30 in the actuator base member 1, and the tracking coils 23 and 24 are each interposed between the magnet 4 and the yoke 13.

The optical pickup apparatus of the axially slidable type which is constructed by using this actuator A functions in a known manner. Namely, laser light emitted from a light-emitting/receiving unit provided on the main base member on which the actuator base member 1 is mounted is reflected upwardly by a prism mirror via a half mirror, and after the reflected light passes through the light passage hole 30 in the actuator base member 1, the light is focused by the objective lens and is radiated to the disk as a light spot. Then, after the reflected light from the disk is transmitted again through the objective lens 22, the reflected light passes through the light passage hole 30, is reflected horizontally by the prism mirror, and returns to a light-receiving element surface of the light-emitting/receiving unit via the half mirror. As the received light is converted to an electrical signal, it is possible to read information recorded on the disk.

In the above-described actuator A, the tracking coils 23 and 24 and the focusing coil 27 are respectively opposed to the magnets 4 in such a manner as to be each disposed between the magnet 4 and the yoke 13, thereby forming an electromagnetically driving circuit. Consequently, in a case where a tracking error has occurred to the objective lens 22, a drive current is supplied to the tracking coils 23 and 24 to rotate the lens holder 20 about the axis of the supporting shaft 8. Consequently, the objective lens 22 is displaced in a tracking direction T indicated by the arrow in FIG. 1, thereby correcting the tracking error of the objective lens 22. In addition, in a case where a focusing error has occurred to the objective lens 22, a drive current is supplied to the focusing coil 27 to vertically move the lens holder 20 along the axial direction of the supporting shaft 8. Consequently, the objective lens 22 is displaced in a focusing direction F indicated by the arrow in FIG. 1, thereby correcting the focusing error of the objective lens 22.

Since oscillation occurs in the lens holder 20 when it is driven as described above, the yokes 13 resonate in a high-frequency range in correspondence with the oscillation of the lens holder 20. At this time, the yokes 13 are secured with extremely high fixing strength since, in addition to the fact that the yokes 13 of the yoke member 11 are fixed by the fastening force of the fixing screws 28 in the conventional manner, the fixing strength is additionally reinforced by the bonding with the adhesive 16. For this reason, the yokes 13 resonate at a resonance frequency of not less than 10 kHz which is higher than the conventional range of 5 to 8 kHz. This resonance frequency of not less than 10 kHz exerts no adverse effect on the focusing and tracking of the actuator A. For this reason, in the case of this actuator A for the optical pickup apparatus, servo control characteristics at the time of focusing and tracking can be constantly maintained with high accuracy.

As described above, with the actuator for an optical pickup apparatus in accordance with the invention, in addition to the fact that the baseplate portion of the yoke member is fixed by the fastening force of the fixing screws in the conventional manner, the yokes are bonded to the base portion by the adhesive to reinforce the fixing strength, so that the yoke member is secured to the actuator base member with extremely high fixing strength. For this reason, the yokes resonate in a high-frequency range at a resonance frequency of not less than 10 kHz which exerts no adverse effect on the focusing and tracking of the actuator. For this reason, in the case of this actuator for the optical pickup apparatus, servo control characteristics at the time of focusing and tracking can be constantly maintained with high accuracy.

What is claimed is:

1. An actuator for an optical pickup apparatus, comprising:

an actuator base member including a base portion having a pair of insertion holes, a pair of yoke portions rising up from the base portion, and a pair of magnets each secured to an inner side surface of the yoke portion;

a yoke member including a baseplate portion and a pair of yoke rising up from the baseplate portion;

a supporting shaft disposed uprightly on the base portion at a position located between the pair of magnets;

a lens holder on which an objective lens and coils are attached, the lens holder being provided in such a manner as to be slidable with respect to the supporting shaft in an axial direction of the supporting shaft and to be rotatable about an axis of the supporting shaft;

a fixing member for securing the actuator base member and the yoke member; and an ultraviolet activated adhesive for bonding the actuator base member and the yoke member, wherein each yoke of the yoke member is inserted through each insertion hole to define a gap therebetween and the baseplate portion is superposed on the base portion, the baseplate portion and the base portion is secured by the fixing member, and the gap between the insertion hole and the yoke is filled with the ultraviolet activated adhesive so that the yoke's substantial oscillating length, over which the yoke is free oscillatable, becomes same with that of the yoke portion.

2. An actuator for an optical pickup apparatus, comprising:

an actuator base member including a base portion having a pair of insertion holes, a pair of yoke portions rising up from the base portion, and a pair of magnets each secured to an inner side surface of the yoke portion;

a yoke member including a baseplate portion and a pair of yoke rising up from the baseplate portion;

a supporting shaft disposed uprightly on the base portion at a position located between the pair of magnets;

a lens holder on which an objective lens and coils are attached, the lens holder being provided in such a manner as to be slidable with respect to the supporting shaft in an axial direction of the supporting shaft and to be rotatable about an axis of the supporting shaft;

a fixing member for securing the actuator base member and the yoke member; and an adhesive for bonding the actuator base member and the yoke member, wherein each yoke of the yoke member is inserted through each insertion hole and the baseplate portion is superposed on the base portion, the baseplate portion and the base portion is secured by the fixing member, and the yoke's portion fitted in the insertion hole is bonded to the base portion by the adhesive.

3. The actuator for an optical pickup apparatus according to claim 2, wherein each yoke of the yoke member is inserted through each insertion hole to define a gap therebetween, the gap is filled with the adhesive so that the yoke's substantial oscillating length, over which the yoke is free oscillatable, becomes shorter than that of the yoke before filling the gap with the adhesive.

4. The actuator for an optical pickup apparatus according to claim 3, wherein the adhesive is an ultraviolet activated adhesive, the gap is filled with the ultraviolet activated adhesive so that the yoke's substantial oscillating length becomes same with that of the yoke portion.

5. The actuator for an optical pickup apparatus according to claim 2, wherein each yoke of the yoke member is inserted through each insertion hole to define a gap therebetween, the adhesive is an ultraviolet activated adhesive, the gap is filled with the ultraviolet activated adhesive so that the yoke's resonance frequency becomes not less than 5 kHz.

6. The actuator for an optical pickup apparatus according to claim 2, wherein the fixing member is a fixing screw.

7. A method of producing an actuator for an optical pickup apparatus, comprising:

providing an actuator base member including a base portion having a pair of insertion holes, a pair of yoke portions rising up from the base portion, and a pair of magnets each secured to an inner side surface of the yoke portion;

providing a yoke member including a baseplate portion and a pair of yoke rising up from the baseplate portion;

inserting each yoke of the yoke member through each insertion hole from one side to define a gap therebetween and superposing the baseplate portion on the base portion;

securing the baseplate portion and the base portion by a fixing member; and filling the gap with an adhesive from the one side.

8. The method of producing an actuator for an optical pickup apparatus according to claim 7, further comprising:

disposing a supporting shaft on the base portion uprightly at a position located between the pair of magnets; and attaching a lens holder on the actuator base member in such a manner as to be slidable with respect to the supporting shaft in an axial direction of the supporting shaft and to be rotatable about an axis of the supporting shaft.

9. The method of producing an actuator for an optical pickup apparatus according to claim 7, further comprising:

irradiating an ultraviolet ray from the one side to harden the adhesive.

* * * * *